Jan. 15, 1952 R. SAULNIER Re. 23,452

REMOVABLE ROOF FOR THE COCKPITS OF AIRCRAFT

Original Filed Nov. 17, 1949 2 SHEETS—SHEET 1

Inventor
Raymond Saulnier
by Brown & Seward
Attorneys

Jan. 15, 1952 R. SAULNIER Re. 23,452

REMOVABLE ROOF FOR THE COCKPITS OF AIRCRAFT

Original Filed Nov. 17, 1949 2 SHEETS—SHEET 2

INVENTOR.
Raymond Saulnier
BY Brown + Seward
Attorneys

Reissued Jan. 15, 1952 Re. 23,452

UNITED STATES PATENT OFFICE 23,452

REMOVABLE ROOF FOR THE COCKPITS OF AIRCRAFT

Raymond Saulnier, Paris, France

Original No. 2,539,331, dated January 23, 1951, Serial No. 127,964, November 17, 1949. Application for reissue August 23, 1951, Serial No. 243,204. In France November 24, 1948

4 Claims. (Cl. 244—121)

Matter enclosed in heavy brackets [ ] appears in the original patent but forms no part of this reissue specification; matter printed in italics indicates the additions made by reissue.

In the applicant's U. S. A. Patent No. 2,125,752 granted on August 2, 1938, for "Removable roof for the cockpits of aircraft," there has been described an improved device for closing the cockpit of an aircraft by means of a roof normally slidable under the control of means operative from inside the plane, so as to open or close the pilot's cockpit, said roof being moreover instantaneously detachable and jettisonable by means of a simple control, also effected from inside the plane in case of emergency.

This invention has for its object an improvement to the above described device, said improvement having for its purpose to make the roof-releasing control means more simple and more rapid.

According to the invention, the roof is secured on sliding elements such as carriages by means of controlled locking elements located at the rear end of the roof and by means of fixed locking elements located at the front end of said roof, the fixed locking elements being so arranged that the roof is capable of pivoting [by] *through* a certain angle about an axis located at its front end when the rear locking means are released, while resilient means urge the roof in the direction of said pivoting motion, so that it is only necessary to act upon the above mentioned controlled locking means to cause an automatic pivoting motion and the automatic release of the roof.

According to one embodiment, the roof is made integral with two carriages so mounted as to be slidable each along one rail, said rails being arranged on either side of the pilot's cockpit, by means of two sliding locking elements provided on either side of the roof in its rear portion, said locking elements being supported on said roof and each of them being adapted to engage one eye provided on the corresponding carriage, said elements being positively controlled against the action of resilient means and by means of two other fixed locking elements each of which is adapted to engage one eye provided on the corresponding carriage at the front portion of the roof, said fixed locking elements being capable of pivoting [by] *through* a certain angle with respect to said eyes.

According to a constructive embodiment of the invention, there is also provided in the rear portion of the roof, e. g. above each carriage eye, at least one pushing-rod resiliently urged towards the carriage and capable of bearing against the same so that, when the positively-controlled locking elements are removed from the corresponding eyes, said pushing-rod pivots the roof about an axis passing through the two eyes located at the front end of the roof, so as to release the front fixed locking elements out of their eyes.

The invention will be best understood with reference to the accompanying drawings in which an embodiment has been shown as a mere illustration.

Figure 2:
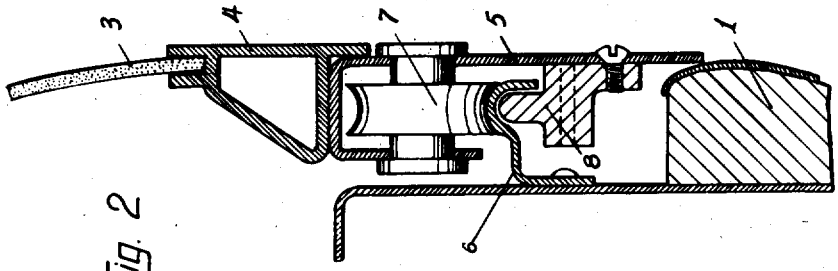
Fig. 2 is a vertical sectional view showing a detail of the carriages sliding on rails provided on the fuselage, said figure also showing how the roof is mounted on said carriages.

Referring to the drawings, there is shown at 1 the fuselage, at 2 the fixed wind-screen and at 3 the slidable and detachable roof. Roof 3 is constituted, in the example shown, by a transparent plastic material element. Said roof is mounted in a suitable manner on longitudinal members 4. There is shown at 5 a carriage and at 6 a rail supported by fuselage 1. It is clear that two devices of this type are provided, one on each side of the fuselage. The carriage supports rollers 7 which are adapted to roll on the above mentioned rail 6. Abutment means 8 are provided to keep the carriage on the rails. The sliding of the roof along the rails is ensured by chains 9 actuated in any suitable manner, e. g. by means of a handle 10 provided inside the cockpit.

In the example shown, the chains are anchored on elements 8.

Figure 1:
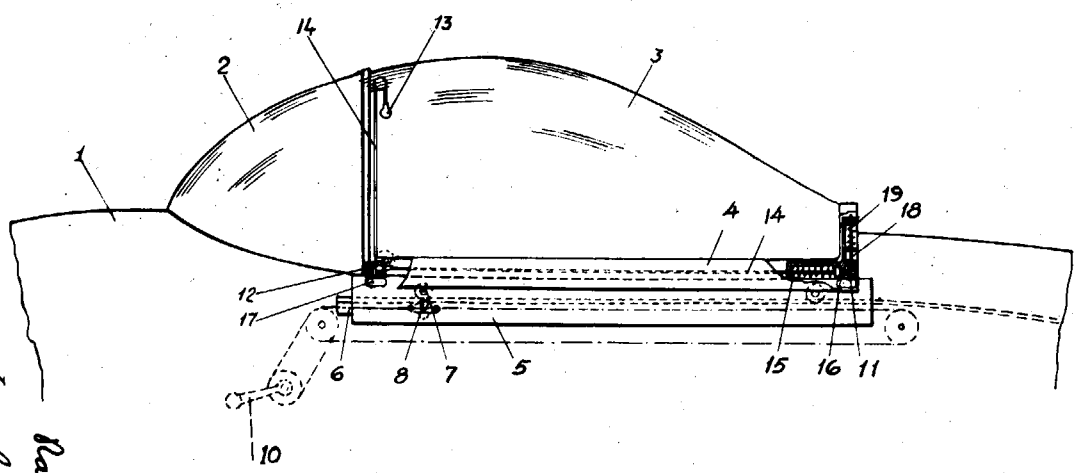
Fig. 1 is a side view showing a portion of a fuselage comprising a slidable and detachable roof according to the invention.
Figure 3:
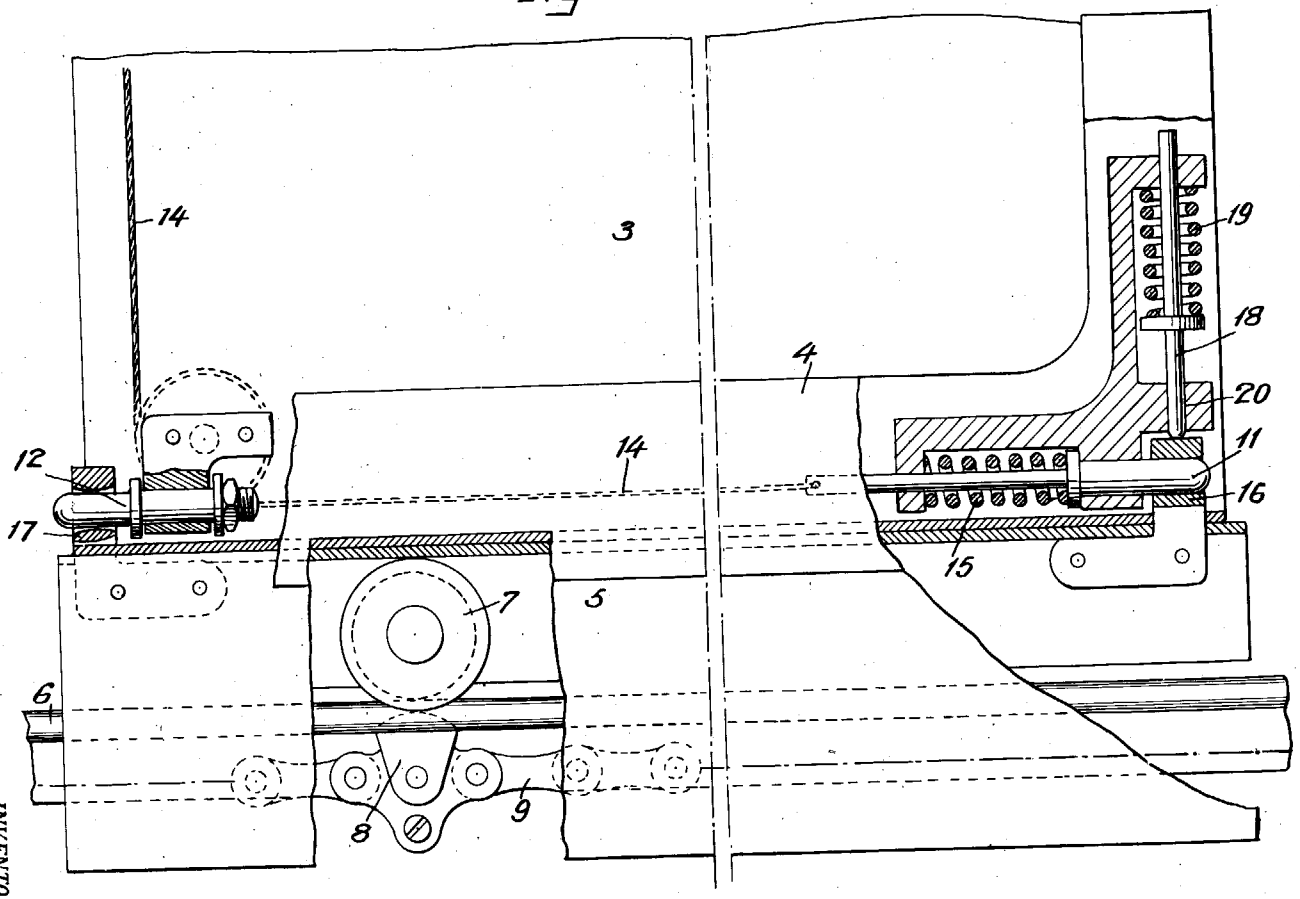
Fig. 3 is a side view, parts being broken away and parts being in section, showing on a larger scale the details of certain parts shown in Fig. 1.

The connection between roof 3—4 and carriage 5 is ensured, according to the invention, on each side of the roof, by two locking elements one of which (11) is movable, the other one (12) being fixed with respect to the roof. Element 11 may receive, under the action of a suitable control such as e. g. a handle 13, through cables 14, a leftwards sliding motion (considering the device as shown in Figs. 1 and 3), resilient means 15 urging, on the contrary, said element 11 from left to right. The locking elements 11 are capable of engaging corresponding eyes 16 provided on the carriages while the fixed locking elements 12 are adapted to be engaged into two corresponding eyes 17.

The eyes 17 are so arranged that the elements 12 are capable of pivoting [by] *through* a certain angle when the rear locking is released. To this effect, for example, the edges of the hole may be rounded, a certain clearance being provided between the rod and said edges, as shown. Alternatively, a knee-joint may be provided.

Besides, part 4 carries two pushing rods 18 urged downwards by resilient means 19, said pushing-rods passing through holes 20 provided in part 4, so as to bear against the upper face of eyes 16.

The operation of this device takes place as follows:

When, in case of emergency, it is required to detach the roof by a rapid handling operation, it is only necessary to pull handle 13, which results in causing a displacement towards the left of the sliding locking elements 11. As soon as said elements are released, the action of pushing-rods 18 causes a pivoting motion of the whole roof about an axis passing through the front eyes 17, so that the locking elements 12 are released from said eyes after which the roof is blown away by the wind.

This combination of sliding locking means located at the rear end of the roof with pushing means pivoting said roof about an axis located at the front portion thereof and with fixed locking means provided on said front portion of the roof, ensures a safe and rapid jettison, while considerably simplifying the construction while decreasing the number of parts which is necessary to ensure simultaneously, according to the very principle of the invention, the possibility, on the one hand, of sliding the roof and, on the other hand, of detaching and jettisoning the same.

It is to be understood that the invention is in no way limited to the above-described embodiment and that many modifications may be made thereto within the scope of the invention.

What is claimed is:

1. In combination with a slidable and detachable roof for an aircraft cockpit, a securing device comprising movable roof locking means located at the rear end of said roof, means located inside the cockpit to release said movable locking means, separable interlocking elements fixed, respectively, to the front end of said roof and to the aircraft, and adapted to permit pivoting of said roof [by] *through* a certain angle about an axis perpendicular to the longitudinal axis of the cockpit, and resilient means adapted to pivot automatically said roof about said *perpendicular* axis when said movable locking means are released so as to permit separation of said interlocking elements from each other.

2. In combination with a slidable and detachable roof for an aircraft cockpit, two longitudinal rails, *one* on [either] *each* side of the longitudinal axis of said cockpit, two carriages capable of sliding along said rails, two rods slidably mounted at the rear end of said roof, *one* on [either] *each* side thereof, [two] *an* eye[s] at the rear end of *each* said carriage, [on either side thereof, elastic] *resilient* means urging said rods into said eyes, means located inside the cockpit to release positively said rods from said eyes against the action of said resilient means, separable interlocking elements fixed, respectively, to the front end of said roof and to the carriages, and adapted to permit pivoting of said roof [by] *through* a certain angle about an axis perpendicular to the longitudinal axis of the cockpit, and *other* resilient means adapted to pivot automatically said roof about said *perpendicular* axis when said movable locking means are released so as to permit separation of said interlocking elements from each other.

3. In combination with a slidable and detachable roof for an aircraft cockpit, a securing device comprising movable roof locking means located at the rear end of said roof, means located inside the cockpit to release said movable locking means, two rods fixedly secured at the front end of said roof, *one* on [either] *each* side thereof, *two carriages capable of sliding along said rods,* [two] *an* eye[s] at the front end of *each* said carriage [on either side thereof], said eyes being adapted to receive said rods so that the same while being locked in said eyes are capable of pivoting [by] *through* a certain angle about an axis passing through both said eyes, and resilient means to pivot automatically said roof about said axis when said movable locking means are released so as to permit separation of said rods from said eyes.

4. In combination with a slidable and detachable roof for an aircraft cockpit, two longitudinal rails, *one* on [either] *each* side of the longitudinal axis of said cockpit, two carriages capable of sliding along said rails, two rods slidably mounted at the rear end of said roof, *one* on [either] *each* side thereof, [two] *an* eye[s] at the rear end of *each* said carriage, [on either side thereof,] resilient means urging said rods into said eyes, means located inside the cockpit to release positively said rods from said eyes against the action of said resilient means, separable interlocking elements fixed, respectively, to the front end of said roof and to the carriages, and adapted to permit pivoting of said roof [by] *through* a certain angle about an axis perpendicular to the longitudinal axis of the cockpit, at least one pushing rod slidably mounted at the rear end of said roof perpendicularly to its longitudinal axis and bearing against said carriage, and *other* resilient means interposed between said roof and said pushing rod to urge the rear end of said roof away from said carriage so as to pivot automatically said roof about said *perpendicular* axis and permit separation of said interlocking elements from each other.

RAYMOND SAULNIER.

REFERENCES CITED

The following references are of record in the file of this patent or the original patent:

UNITED STATES PATENTS

| Number | Name | Date |
|---|---|---|
| 2,125,752 | Saulnier | Aug. 2, 1938 |
| 2,403,250 | Verhagen | July 2, 1946 |

FOREIGN PATENTS

| Number | Country | Date |
|---|---|---|
| 703,828 | Germany | Mar. 17, 1941 |